United States Patent [19] [11] Patent Number: 5,218,286
VanDunk [45] Date of Patent: Jun. 8, 1993

[54] MULTICHANNEL BATTERY CHARGER

[75] Inventor: Guy J. VanDunk, West Carrollton, Ohio

[73] Assignee: Monarch Marking Systems, Inc., Dayton, Ohio

[21] Appl. No.: 760,764

[22] Filed: Sep. 16, 1991

[51] Int. Cl.⁵ .............................................. H02J 7/04
[52] U.S. Cl. ....................................... 320/31; 320/23
[58] Field of Search .............................. 320/31, 20-23, 320/27, 30, 32

[56] References Cited

U.S. PATENT DOCUMENTS

| 3,848,173 | 11/1974 | Hase | 320/2 |
| 3,864,617 | 2/1975 | Smith et al. | 320/23 |
| 4,395,672 | 7/1983 | Gassaway | 320/31 |
| 4,609,861 | 9/1986 | Inaiwa et al. | 320/32 |
| 4,639,655 | 1/1987 | Westhaver et al. | 320/14 |
| 4,639,656 | 1/1987 | Mukai | 320/22 |
| 4,829,225 | 5/1989 | Podrazhansky et al. | 320/14 |
| 4,961,043 | 10/1990 | Koenck | 320/21 |

FOREIGN PATENT DOCUMENTS

| EP0126936A2 | 12/1984 | European Pat. Off. | 320/21 |
| EP0147241A2 | 7/1985 | European Pat. Off. | 320/31 |
| EP0222381A2 | 5/1987 | European Pat. Off. | 320/31 |
| EP0265879A2 | 5/1988 | European Pat. Off. | 320/31 |
| 1411560A | 10/1975 | United Kingdom | 320/31 |
| 1428671A | 3/1976 | United Kingdom | 320/31 |

OTHER PUBLICATIONS

Patents Act 1977, Examiner's report to the Comptroller under Section 17 (The Search Report of Application No. GB 9219597.3, dated Nov. 4, 1992, Examiner M. J. Billing.

Primary Examiner—Emanuel T. Voeltz
Assistant Examiner—Matthew Nguyen
Attorney, Agent, or Firm—McAndrews, Held & Malloy, Ltd.

[57] ABSTRACT

A battery charger includes a microcontroller for simultaneously and independently charging the batteries of a number of battery powered devices. The battery charger includes a constant current source associated with each channel that is connectable to a device's battery. Each constant current source is switchable between a trickle charge state and a high charge state under the control of the microcontroller to charge the battery connected thereto quickly and safely. The microcontroller further performs diagnostics continuously throughout the charging of a battery to determine whether malfunctions have occurred in the microprocessor of the microcontroller, in the software of the microcontroller or in any of the current sources.

36 Claims, 9 Drawing Sheets

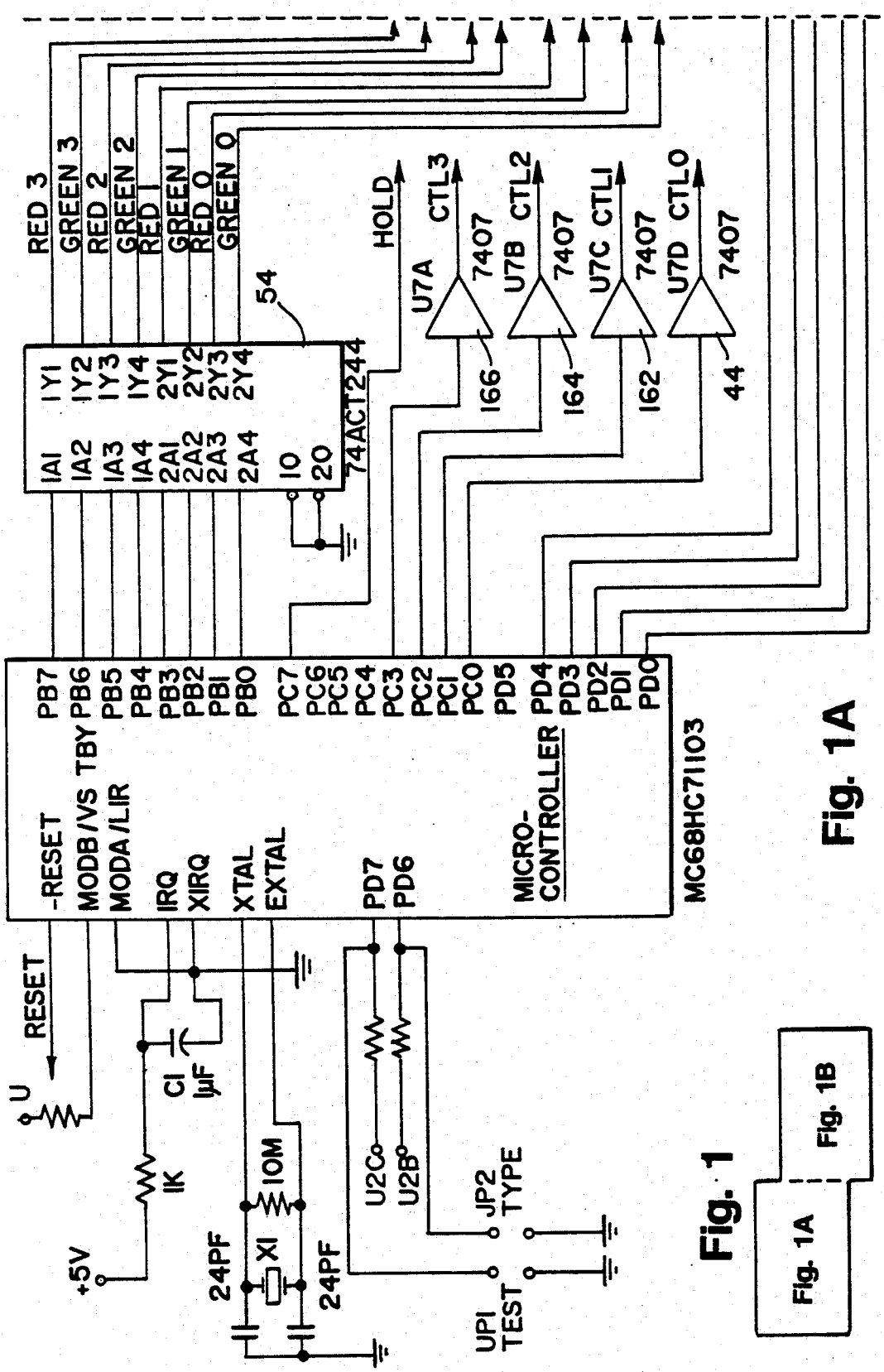
Fig. 1A
Fig. 1

2. POWER UP DIAGNOSTICS

POWER UP DIAGNOSTICS (CONTINUED)

MULTICHANNEL BATTERY CHARGER

TECHNICAL FIELD

The present invention relates to a battery charger for simultaneously and independently charging a number of rechargeable batteries and more particularly to such a multichannel battery charger that utilizes two charge rates and continuous diagnostic checks to ensure that the batteries are charged quickly and safely without overcharging.

BACKGROUND OF THE INVENTION

Battery chargers for devices such as hand-held printers are known to be capable of charging the batteries of a number of such devices simultaneously. One known battery charger has two rates of charging, a high charge rate and a trickle charge rate. A functioning battery is charged by this charger on a high charge rate until the unit senses a battery voltage of a predetermined end point level. As soon as the battery voltage reaches the predetermined end point level, the charger determines that the battery is fully charged and switches from the high charge rate to the trickle charge rate. This known battery charger further includes a timer that is started when a battery is detected. If the timer reaches a predetermined value before the battery voltage reaches the end point level, the charger switches to the trickle charge rate and flashes a red LED indicating a possible problem with the battery. The method used by this known charger for determining whether a battery is fully charged has been found to be unreliable. Further, the overcharge protection provided by the timer of this charger often results in batteries that are only 50% charged when the charger switches from the high charge rate to the trickle charge rate.

SUMMARY OF THE INVENTION

In accordance with the present invention, the disadvantages of prior battery chargers have been overcome. The multichannel battery charger of the present invention utilizes two charge rates and continuous diagnostic checks to ensure that the batteries connected thereto are fully charged quickly and safely without overcharging.

More particularly, the battery charger of the present invention has a number of channels, each channel being connectable to a rechargeable battery of, for example, a battery powered printer. Each channel has an associated current source that is independently controlled by a microcontroller to switch from a low charge state to a high charge state and from the high charge state to a low charge state in order to quickly and safely charge the battery.

To prevent overcharging of a battery, the microcontroller determines whether any one of a number of events have occurred on a given channel and in response to the detection of one of those events, the microcontroller changes the state of the current source for that channel from the high charge state to the low charge state. One of these events is the detection of a pre-determined drop in the sensed voltage of a battery connected in a given channel after that battery voltage has reached a first predetermined level, indicating a peaking of the battery voltage. A second event is the detection that the sensed battery voltage has been above a stable battery level for a given period of time. A third event is the detection that the sensed battery voltage has reached a cut-off level indicating that the battery should be fully charged. A fourth event is the detection that a battery has been coupled to the charger for a long period of time, for example, ninety minutes, and the current source to which the battery is connected is in the high charge state.

The microcontroller further performs a number of checks to determine whether a battery connected to a given channel is bad and controls a display to provide a visual indication thereof. More particularly, the microcontroller determines whether any of the channel outputs have been shorted and whether the short is permanent or momentary. If the short is determined to be permanent, the microcontroller controls the display to provide a bad battery indication. The microcontroller also determines whether a battery connected to a given channel of the battery charger has reached a minimum level within a given period of time while charged by a current source in the low charge state. If the battery has not reached the minimum voltage level within that given period of time, the microcontroller determines that the battery is bad and controls the display to provide a visual indication thereof.

The battery charger of the present invention further includes a switchable device disposed between a power supply of the battery charger and each of the current sources for coupling power to each of the current sources when the device is in a first position and for cutting off power to each of the current sources when the device is in a second position. The switchable device is responsive to a signal recurring substantially periodically to maintain itself in the first position and is in the second position in the absence of the recurring signal. The microcontroller provides the recurring signal to the switchable device wherein the switchable device prevents each of the current sources from charging a battery in response to a malfunction in the microcontroller that prevents it from applying the recurring signal to the switchable device. This provides a diagnostic check for the microprocessor that operates continuously during the charging of a battery. Other diagnostic checks performed by the battery charger continuously during the charging of a battery include the detection of a software malfunction and the detection of a current source malfunction.

These and other objects, advantages and novel features of the present invention, as well as details of an illustrative embodiment thereof, will be more fully understood from the following description and from the drawings.

DETAILED DESCRIPTION OF THE DRAWING

FIGS. 1A, B and C form a schematic diagram of the battery charger of the present invention;

FIG. 2 is a flow chart illustrating the Main operating program of the microcontroller shown in FIG. 1;

FIGS. 3A and B form a flow chart illustrating the Power-Up Diagnostics performed by the microcontroller shown in FIG. 1;

DETAILED DESCRIPTION OF THE PREFERRED EMBODIMENT

Figure 1B:
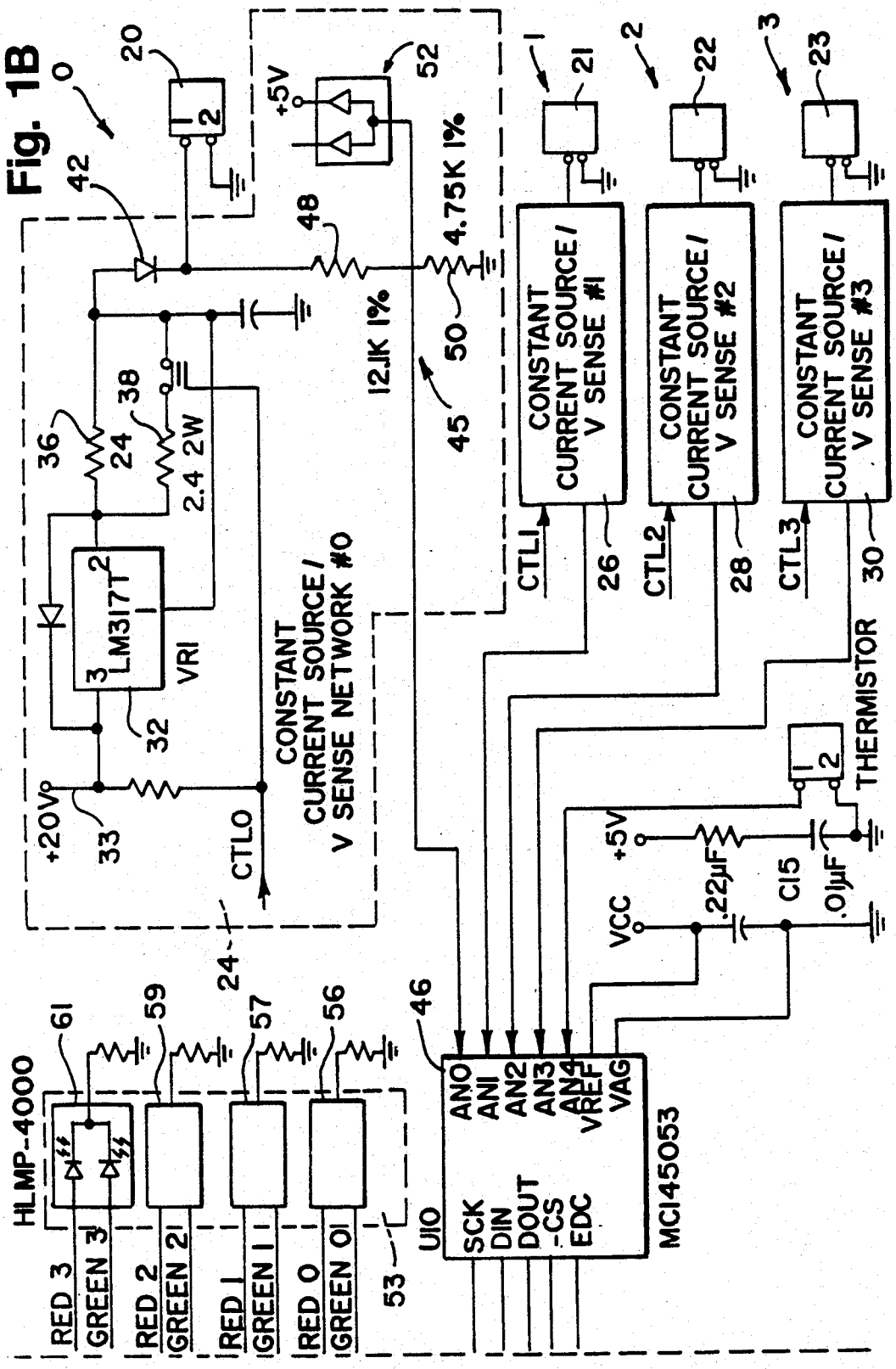

The battery charger of the present invention, as shown in FIGS. 1A, 1B, and C includes four channels 0, 1, 2 and 3 under the control of a microcontroller 10 for simultaneously and independently charging the batteries of up to four devices. Each of the devices may take, for example, the form of a printer or hand-held labeler having a detachable handle for housing the printer's battery as shown in U.S. Pat. No. 4,479,843 incorporated herein by reference. The charger of the present invention may, however, be used to charge the batteries of any device having rechargeable batteries. As shown in U.S. Pat. No. 4,479,843, the printer's battery may actually consist of a number of series connected batteries. However, for simplicity, the term "battery" as used herein refers to one or more batteries connected to power a single device. Further, although the charging method of the present invention is well suited for charging nickel cadmium batteries, it is equally applicable to charging other types of batteries as well. Each channel 0, 1, 2 and 3 of the battery charger has a respective output connection 20, 21, 22 and 23 for a rechargeable battery. Where the battery is contained in a detachable handle of the device, such as the printer noted above, the handle is detached from the device and attached for charging to an output connection 20–23 via a mating connection in the handle.

Each channel 0, 1, 2, and 3 of the battery charger includes a respective constant current source 24, 26, 28 and 30 that is switchable by the microcontroller 10 between a low charge or trickle charge state and a high charge state. Only the constant current source 24 is shown in detail, the other constant current sources 26, 28 and 30 being of the same configuration. The constant current source 24 includes a voltage regulator 32 that is coupled via line 33 to a 20-volt power supply 34 shown in FIG. 1C. The output of the voltage regulator is connected to a biasing resistor 36 that is connected in parallel with a biasing resistor 38 and P-channel FET 40 to provide 500 mA in a high charge state or 50 mA in a trickle charge state to the channel output connection 20 via a diode 42. More particularly, in the high charge state, the microcontroller 10 outputs a low signal on port PC0 to an open collector buffer 44 the output of which, CTL0 is coupled to the gate of the FET 40. The open collector buffer is pulled up to 20+ volts in response to the low output from the microcontroller port PC0 and in turn, pulls the gate of the FET 40 to ground, turning the FET 40 on. When the FET 40 is on, the constant current source 24 is in the high charge state providing 500 mA to the output connection 20. When the microcontroller 10 outputs a high signal from the port PC0, the FET 40 is turned off so that 50 mA is applied to the output connection 20 in the low charge state of the current source 24. It is noted that each of the constant current sources 24, 26, 28, and 30 is actually continuously variable between two limits. That is, by changing the duty cycle of the signal output from the microcontroller via ports PC0, PC1, PC2, and PC3, the current provided by the respective current source 24, 26, 28, and 30 may be continuously varied between 50 mA and 500 mA. Therefore, the battery charger of the present invention is easily adaptable to charging batteries at different levels within the range of 50 to 500 mA.

The microcontroller 10 includes a microprocessor; a RAM that provides a scratch pad memory to hold current voltage and timing values for each channel; and an EPROM for storing the software according to which the microprocessor operates. The microcontroller 10 samples the voltage of each printer's battery connected to a given channel of the battery charger via a voltage divider network, shown for channel 0 at 45, and an analog to digital converter 46. Only the voltage divider network for the channel 0 is shown for simplicity, the networks for the remaining channels being the same. The voltage divider network for channel 0 includes a pair of resistors 48 and 50 with a clamping diode 52 coupled to the connection between the resistors in order to maintain the maximum voltage applied to the analog to digital converter 46 lower than 5.7 volts. The microcontroller 10 samples the voltage of the battery connected to each channel 0, 1, 2, and 3 continuously at a given sample rate while the charger is in operation in order to perform various diagnostic checks and to control the state of each of the constant current sources 24, 26, 28 and 30.

The microcontroller 10 also controls an LED display 53 via a driver 54 in order to provide an indication for each channel that the battery connected to the channel is charging, fully charged or bad. The LED display 53 further provides an indication of various diagnostic test results under the control of the microcontroller 10. The LED display 53 includes four pairs of green and red LED's 56, 57, 59 and 61, each pair being associated with a given channel. Again, for simplicity, only the LED pair 56 for channel 0 is shown in detail.

Figure 1C:
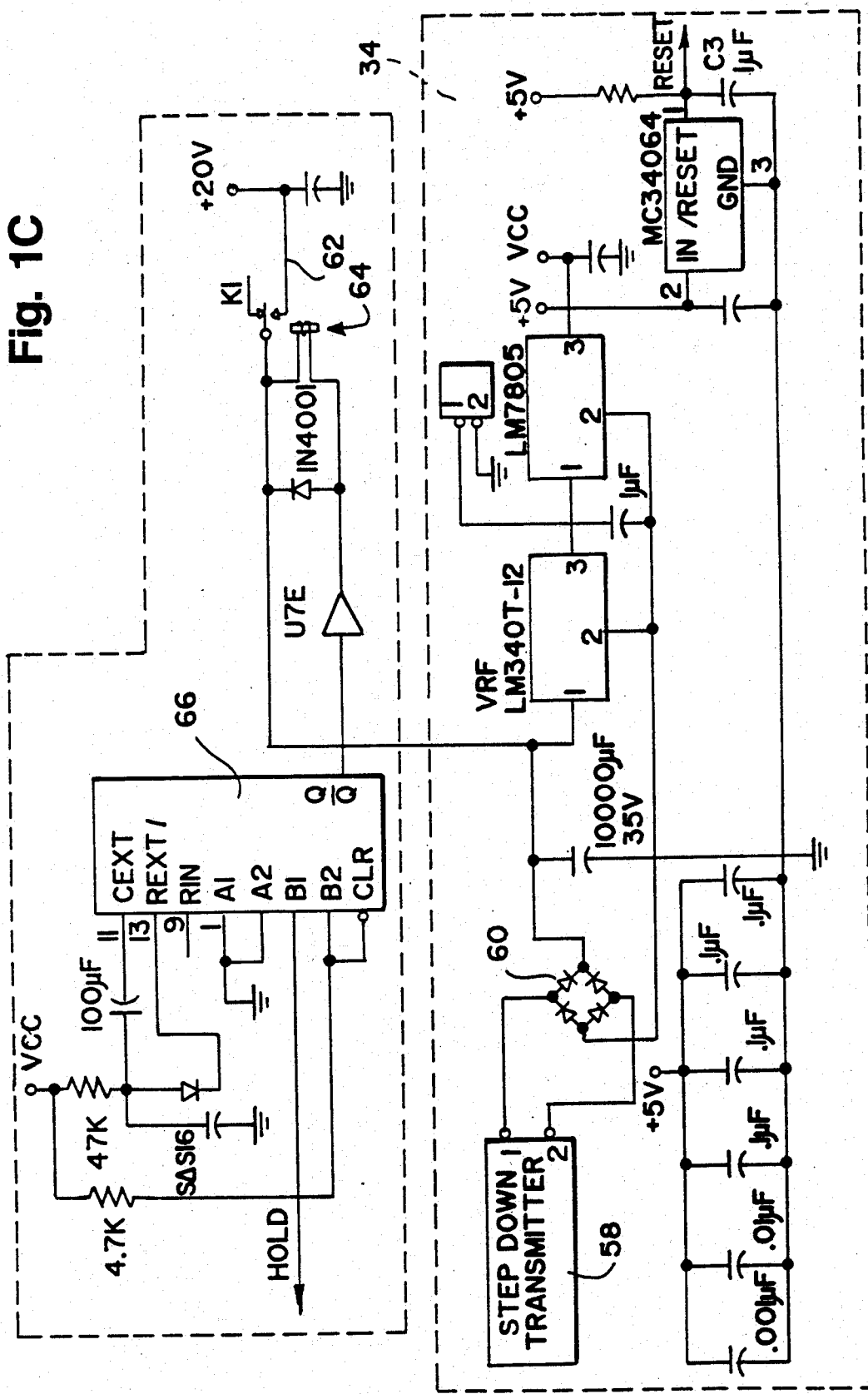

As illustrated in FIG. 1C, the power supply 34 of the battery charger includes a step down transformer 58 coupled to a bridge rectifier 60 so as to provide +20 volts on a line 62 when a relay 64 is energized. The relay 64 is energized by a retriggerable one shot 66 that is controlled by a HOLD signal applied thereto from the microcontroller 10. More particularly, the microcontroller 10 provides a HOLD pulse to the one shot 66 every 2.5 seconds to continually re-trigger the one shot so that it does not time out under normal operating conditions. As long as the one shot is re-triggered, its $\overline{Q}$ output is held low and the relay 64 is energized to provide current to each of the current sources 24, 26, 28 and 30. If a fault condition is detected in the battery charger that requires the battery voltage to be cut-off, the microcontroller can merely stop retriggering the one shot 60. Further, if the microcontroller 10 itself malfunctions, the hold signal will not be provided to the one shot 66 thereby cutting off power to the constant current sources 24, 26, 28, and 30. The constant current sources are thus prevented from overcharging the batteries connected thereto in the presence of a microprocessor malfunction.

Figure 2:
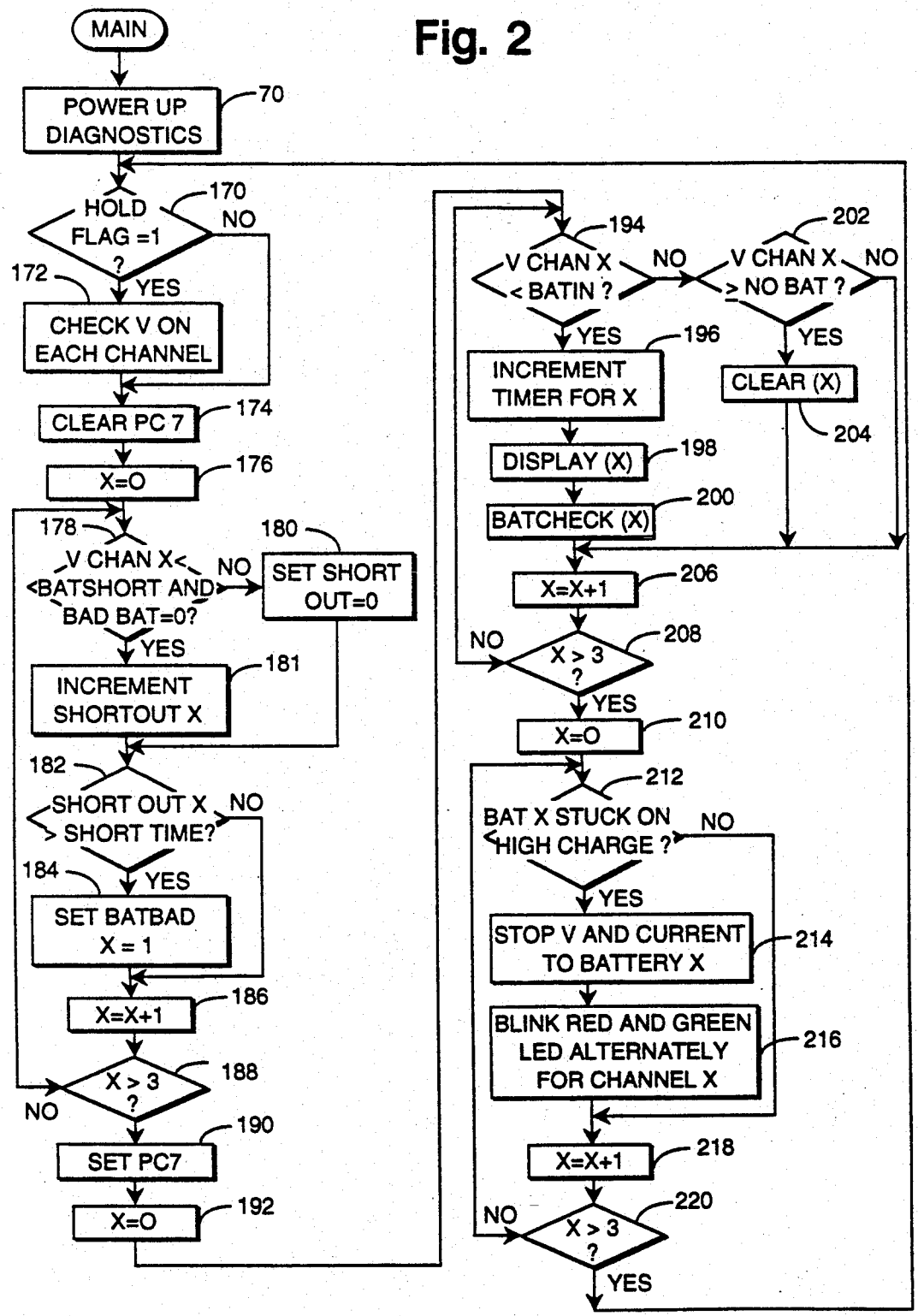

The microcontroller 10 operates in accordance with the Main software program shown in FIG. 2 to perform several diagnostic tests and to call various subroutines which, for example, control the display 53 and the state of each of the current sources 24, 26, 28 and 30. First, the microcontroller 10 implements, at block 70, a Power-Up Diagnostic subroutine when power is first applied or the microcontroller 10 is reset.

Figure 3A:
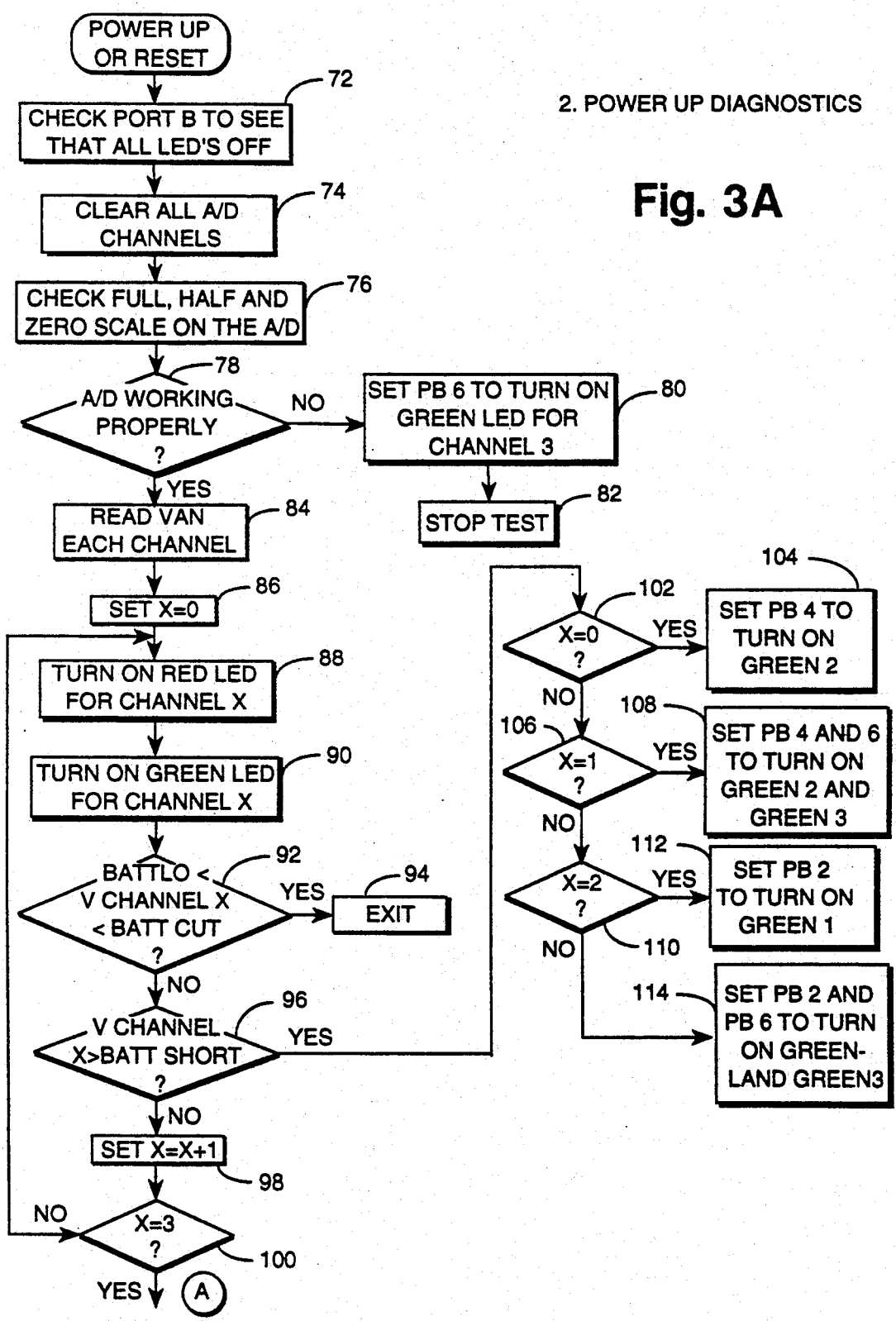
Figure 3B:
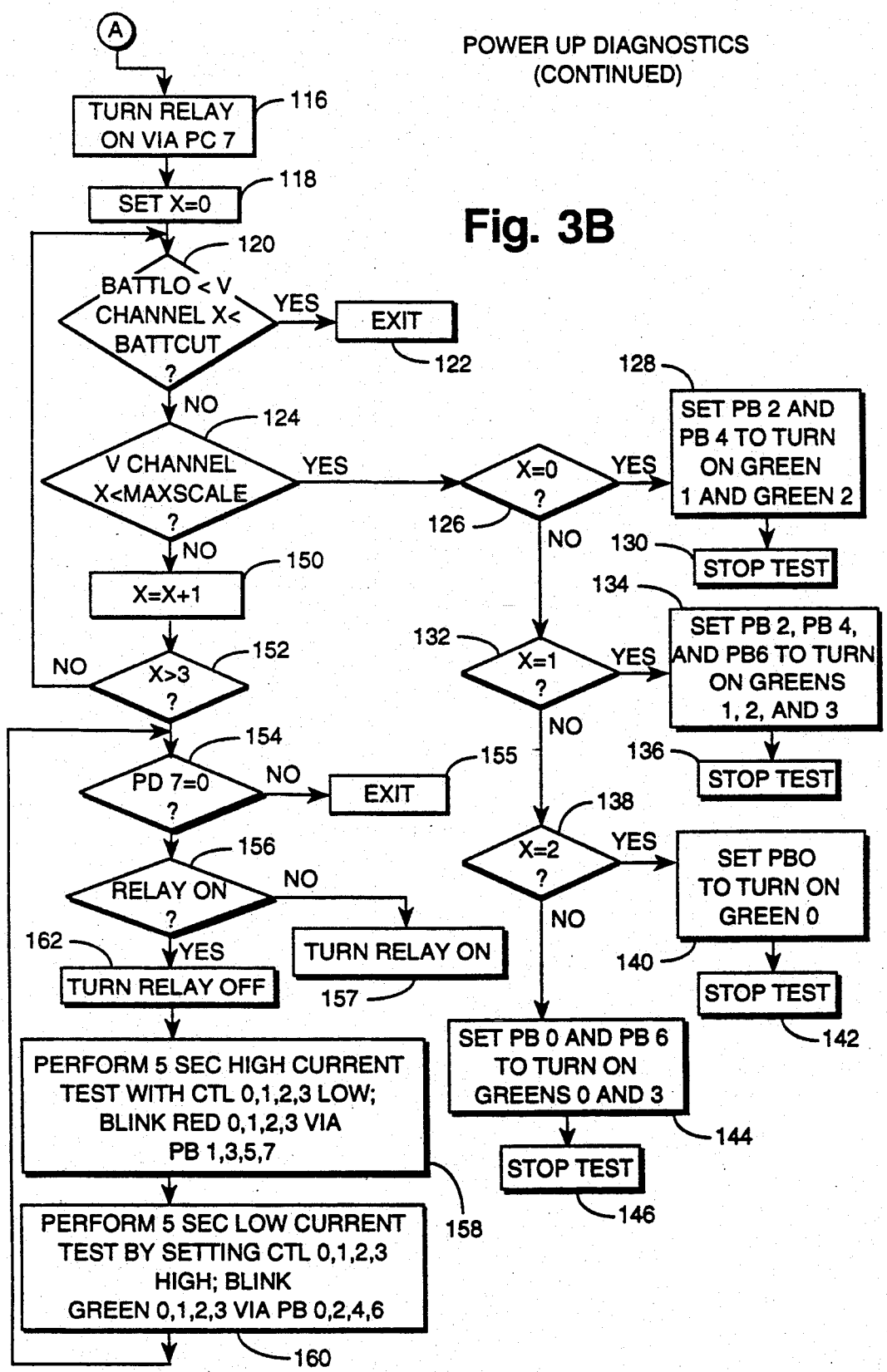

As shown in FIGS. 3A and B, upon entering the Power-Up Diagnostic subroutine, the microcontroller 10, at block 72, checks ports PB0–PB7 to see that all of the LED's of the display are off. Thereafter, at block 74, the microcontroller 10 clears all of the channels of the analog to digital converter 46 and at block 76 checks the full, half and zero scale on the analog to digital converter 46. If the microcontroller 10 determines at block 78 that the analog to digital converter is not working properly, the microcontroller 10, at block 80, sets the port PB6 to turn on the green LED, GREEN3, associated with channel 3. Thereafter, the microcontroller stops the diagnostic test at block 82.

If the microcontroller 10 determines that the analog to digital converter 46 is working properly, at block 84 the microcontroller reads the voltage on each of the channels 0, 1, 2 and 3 as provided to the microcontroller 10 from the analog to digital converter 46. Thereafter, the microcontroller 10, at block 86, initializes a pointer X to 0 in order to start a timing test in which the microcontroller 10 actuates the LED's of the display 53 in a particular pattern. During this test, the microcontroller 10 further determines whether power is being applied to a particular channel when it should not be applied, the relay 64 being unenergized. More particularly, at block 88, the microcontroller 10 turns on the red LED for channel 0 for 0.5 seconds and thereafter at block 90 turns on the green LED for channel X for 0.5 seconds. At block 92, the microcontroller 10 determines whether the voltage sampled for channel X at block 84 is greater than a value battlo and less than a value battcut. Battlo represents the minimum battery voltage for a self test whereas battcut represents a cut-off value of, for example, 16.7 volts. If the sampled voltage is between battlo and battcut, the microcontroller 10 determines that a battery is connected to the output connection 20 of channel X and exits the Power-Up Diagnostic routine at block 94. If the microcontroller determines that there is no battery connected to channel X at block 92, the microcontroller 10 at block 96 determines whether there is a short on channel X by comparing the voltage on channel X to a value battshort which represents a voltage level indicating that the battery channel outputs are shorted or there is no power being applied. If the voltage on a channel is less than or equal to battshort, the test for channel X is satisfied and the microcontroller at block 98 increments the pointer X and thereafter repeats the tests of block 88, 90, 92, and 96 for the next channel. These tests are repeated for each of the channels until X is greater than 3.

If, however, the microcontroller 10 determines at block 96 that the voltage on channel 0 is greater than the value battshort, the microcontroller 10 proceeds to block 102. If channel 0 is the channel determined by the microcontroller 10 to have power applied when it should not be, the microcontroller proceeds from block 102 to block 104 to set the port PB4 to turn on the green LED associated with channel 2. If the microcontroller 10 determines that power is applied to channel 1 when it should not, the microcontroller 10 proceeds from block 106 to block 108 to set the ports PB4 and PB6 so as to turn on the green LED's associated with channels 2 and 3. If the microcontroller 10 determines that power is applied to channel 2 when it should not, the microcontroller proceeds from block 110 to block 112 to set the port PB2 to turn on the green LED for channel 1. Similarly, if the microcontroller 10 determines that power is applied to channel 3 when it should not, the microcontroller proceeds to block 114 to set the ports PB2 and PB6 to turn on the green LED's associated with channels 1 and 3.

If the microcontroller 10 determines that power is not applied to any of the channels 0, 1, 2 or 3 when it should not, the microcontroller proceeds to block 116 from block 100. At block 116, the microcontroller 10 turns on the relay 64 via port PC7 and the one shot 66. Thereafter, the microcontroller 10 sets a pointer X equal to 0 at block 118 in order to initiate a test in which it is determined whether no power is applied to each of the channels when power should be applied. More particularly, at block 120 the microcontroller 10 determines whether the voltage on a given channel is greater than battlo and less than battcut. If so, the mircrontroller 10 determines that a battery is connected to the channel and skips the diagnostic test, exiting the subroutine at block 122. If no battery is connected, however, the microcontroller proceeds with the test at block 124. At block 124, the microcontroller 10 determines whether the sensed voltage on a particular channel is less than a value maxscale. Maxscale represents the minimum level for testing high voltage with no battery. If the voltage on a particular channel is less than maxscale as determined by the microcontroller 124, the microcontroller 10 determines that no power is being applied when it should be. If the microcontroller determines at block 126 that channel 0 is the channel which does not have power applied, the microcontroller proceeds to block 128 to set the ports PB2 and PB4 to turn on the green LED's associated with channels 1 and 2. At block 130 the microcontroller stops the diagnostic test. If the microcontroller 10 determines at block 132 that it is channel 1 that does not have power applied when it should be, the microcontroller 10 proceeds to block 134 to set the ports PB2, PB4 and PB6 to turn on the green LED's associated with channels 1, 2 and 3. The microcontroller thereafter stops the diagnostic test at block 136. If the microcontroller 10 determines at block 138 that no power is applied to channel 2 when it should be, the microcontroller 10 proceeds from block 138 to block 140 to set port PB0, turning on the green LED for channel 0. Thereafter, the microcontroller 10 stops the test at block 142. If the microcontroller 10 determines that there is no power being applied to channel 3 when it should be, the microcontroller proceeds from block 138 to block 144 to set ports PB0 and PB6 turning on the green LED's associated with channels 0 and 3 at block 144. Thereafter, at block 146 the microcontroller 10 stops the test. The microcontroller 10 increments the pointer X at block 150 when it is determined that the voltage on a particular channel is greater than the value maxscale so that all four of the channels 0, 1, 2, and 3 may be checked. When all of the four channels have been checked, the microcontroller 10 determines that X is greater than 3 at block 152 and proceeds to block 154.

It is noted that the indications provided by the LED display for the diagnostic tests discussed above are coded in a binary manner as shown in Table I.

TABLE I

| Green LED for Channel: | | | | |
|---|---|---|---|---|
| 0 | 1 | 2 | 3 | |
| X | X | X | 0 | One |
| X | X | 0 | X | Two |
| X | X | 0 | 0 | Three |
| X | 0 | X | X | Four |
| X | 0 | X | 0 | Five |
| X | 0 | 0 | X | Six |
| X | 0 | 0 | 0 | Seven |
| 0 | X | X | X | Eight |
| 0 | X | X | 0 | Nine |

The "one" code indicates a possible failure of the analog to digital converter 46. The codes "two," "three,"

"four," and "five" indicate that power is being applied to a respective channel 0, 1, 2 and 3 when it should not. Further the codes "six," "seven," "eight," and "nine" indicate that no power is being applied to a respective channel 0, 1, 2 and 3 when it should be.

At block 154, the microcontroller 10 determines whether the input terminal PD7 is equal to 0, i.e., whether the terminals JP1 have been shorted in order to implement the service diagnostics. If the terminals JP1 have not been shorted, the microcontroller 10 does not implement the service diagnostics but exits the Power-Up Diagnostics subroutine at block 155. If, however, the micrcontroller determines at block 154 that the terminals JP1 have been shorted, the microcontroller 10 proceeds to block 156 to determine whether the relay 64 is on. If the microcontroller 10 determines that the relay 64 is not on, the microcontroller proceeds to block 157 to turn the relay 64 on. Thereafter, the microcontroller 10 proceeds to blocks 158 and 160 to check the operations of the P channel FETs 40 associated with each of the channels 0, 1, 2, and 3. More particularly, at block 158 the microcontroller 10 performs a five second high current test with the inputs to each of the buffers 44, 162, 164, and 166 low. During this test, the red LED's associated with each of the channels 0, 1, 2, and 3 are blinked by the microcontroller 10 at block 158 via the output ports PB1, PB3, PB5, and PB7. After the five-second high current test is performed at block 158, the microcontroller 10 proceeds to block 160 to perform a five-second low current test by setting the inputs to each of the buffers 44, 162, 164, and 166 high and blinking the green LED's associated with each of the channels 0, 1, 2, and 3 via the output ports PB0, PB2, PB4, and PB6 of the microcontroller 10. Thereafter, the microcontroller 10 loops back to block 154. If the JP1 terminals are still shorted, the microcontroller again proceeds to block 156 to determine if the relay 64 is on. If the relay 64 is determined to be on, the microcontroller 10 proceeds to block 162 turning off the relay 64 and repeating the five-second timing tests at blocks 158 and 160. The tests performed at blocks 158 and 160 are repeated with the relay 64 alternately on and off until the short is removed from the test terminals JP1. The tests performed at blocks 158 and 160 allow diagnostic personnel to check the operation of each of the P channel FET's 40 associated with channels 0, 1, 2, and 3. These tests also allow diagnostic personnel to check the timing operation of the microcontroller 10.

After completing the Power-Up Diagnostics at block 70, the microcontroller 10 returns to the Main Program at block 170 where it is determined whether a hold flag is set. The hold flag is set once every 250 msec which represents the sampling rate of the battery charger. If the microcontroller determines that the hold flag is set at block 170, the microcontroller 10 at block 172 checks the voltage on each of the channels 0, 1, 2, and 3. Thereafter, the microcontroller 10 proceeds to block 174 to clear the port PC7. The port PC7 is cleared and set by the microcontroller 10 periodically to continually retrigger the one shot 66 which in turn maintains the relay 64 energized to provide power to the constant current sources 24, 26, 28, and 30 as discussed above.

At block 176, the microcontroller 10 initializes a pointer X by setting it equal to 0 so that each channel 0, 1, 2, and 3 may be checked to determine if the channel's outputs are shorted. More particularly, the microcontroller 10 at block 178 determines whether the sensed voltage on a particular channel is less than the value battshort and whether a flag, badbat is set equal to 0. If the microcontroller at block 178 determines that the voltage on a given channel is not less than battshort or that the badbat flag is not set equal to 0, the microcontroller 10 proceeds to block 180 to set a shortout flag equal to 0. However, if the voltage on a given channel is less than the value battshort and the badbat flag is equal to 0, the microcontroller 10 proceeds to block 181 to increment a variable shortout for the battery connected to channel X. From either blocks 180 or 181, the microcontroller 10 proceeds to block 182 to determine whether the variable shortout for channel X is greater than a value designated short-time which represents the maximum number of checks for a short or a static discharge before reset. If shortout is not greater than short-time, the microcontroller 10 proceeds to block 186 wherein the pointer X is incremented and if not all of the channels have been checked as determined at block 188 the microcontroller returns to block 178. However, if the microcontroller determines at block 182 that the variable shortout for channel X is greater than the value short-time, the microcontroller proceeds to block 184 where it sets the badbat flag for channel X equal to 1. As discussed below with respect to FIG. 5, when the badbat flag is set, the microcontroller 10 controls the LED's of the display 53 associated with channel X to blink the red LED on and off so as to provide an indication to the user that the battery connected to the channel is bad. After checking each of the channels 0, 1, 2, and 3 to see if they are shorted, the microcontroller proceeds from block 188 to block 190 where the output of port PC7 is set to retrigger the one shot 66. At block 192, the microcontroller 10 initializes a pointer X by setting it equal to 0 and proceeds to block 194.

Figure 4:
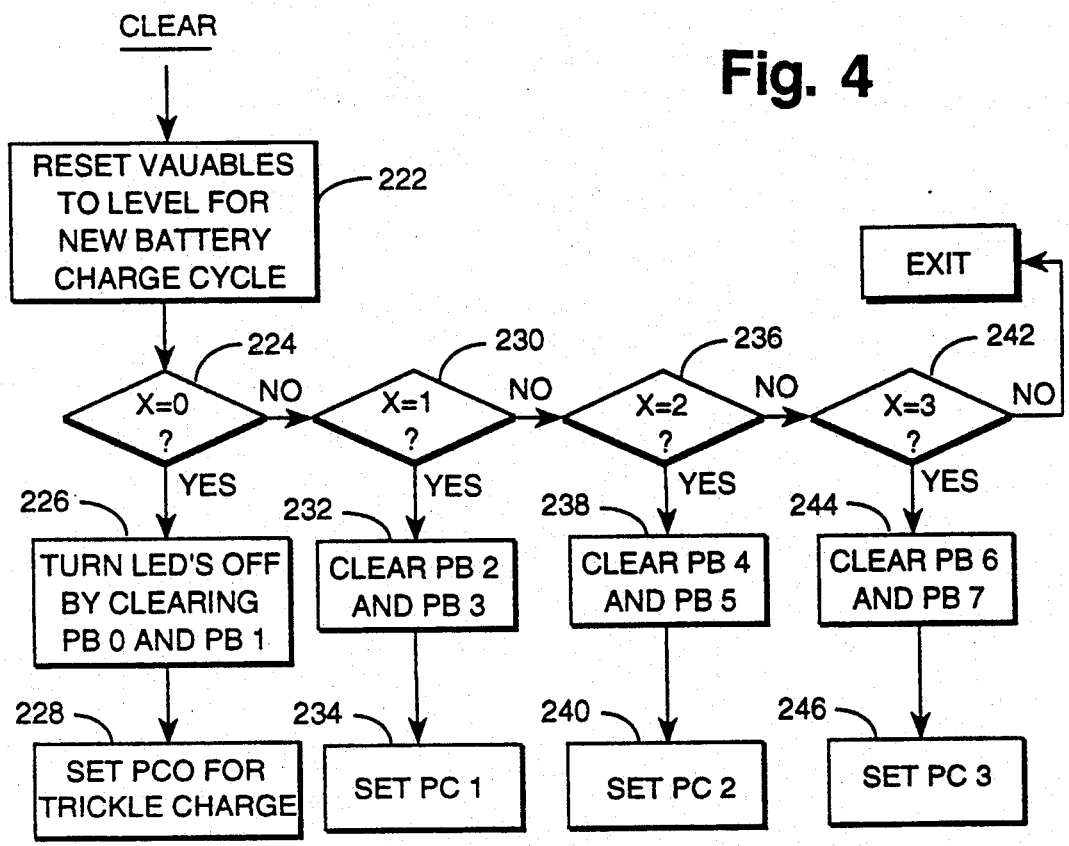
FIG. 4 is a flow chart illustrating the Clear software routine of the microcontroller shown in FIG. 1.

At block 194, the microcontroller 10 determines whether the sensed voltage for a given channel is less than a value batin that represents a battery voltage used to determine if a battery is connected to the output connection 20, 21, 22, or 23 of the given channel. If the microcontroller determines at block 194, that no battery is connected to channel X, the microcontroller proceeds to block 202 to determine whether the voltage on channel X is greater than or equal to a value nobat which represents the minimum voltage level for an output connection 20-23 having no battery connected thereto. If the microcontroller 10 determines at block 202 that the voltage on the channel X is greater or equal to nobat, the microcontroller at block 204 calls the subroutine clear for channel X as depicted in FIG. 4.

Figure 5:
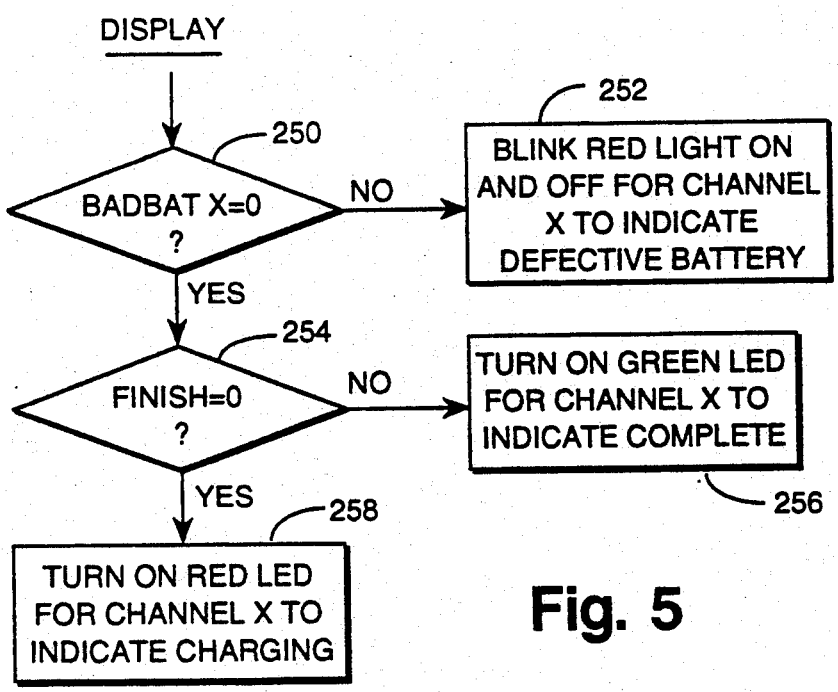
FIG. 5 is a flow chart illustrating the Display software routine of the microcontroller shown in FIG. 1.

If the microcontroller 10 determines at block 194 that a battery is connected to the output connection of a given channel, the microcontroller proceeds to block 196 to increment a timer associated with the channel X. More particularly, each channel has an associated software timer that is incremented at block 196 and provides a time measurement starting at the point when a battery is first detected as being coupled to the output connection of a given channel. From block 196, the microcontroller 10 proceeds to block 198 to call a Display subroutine as depicted in FIG. 5, discussed in detail below. Thereafter, the microcontroller proceeds to block 200 to call a Batcheck subroutine for channel X as discussed in detail with reference to FIG. 6. At block 206, the microcontroller increments the pointer X and at block 208 determines whether each of the channels 0, 1, 2, and 3 have been checked to determine whether a battery is connected thereto or not. If all of the channels have been so checked, the microcontroller proceeds from block 208 to block 210.

At block 210, the microcontroller 10 reinitializes the pointer X for a software loop that determines whether a battery connected to a given channel is still on high charge when it was suppose to have been switched to trickle charge. More particularly, at block 212, the microcontroller determines that a battery is stuck on high charge if a Complete flag is set equal to 1; the voltage on channel X is greater than a value stblbat; the voltage on the channel X is less than the value batin; and a value time-channel X is greater than a value mintime and less than a value maxtime. The value stblbat represents a stable battery voltage of, for example, 15 volts. The value, mintime represents the minimum time for checking a fully charged battery whereas the value maxtime represents the maximum time to attain the minimum battery voltage. If the microcontroller 10 determines at block 212 that the battery connected to a given channel is stuck on the high charge, the microcontroller 10 proceeds to block 214. At block 214 the microcontroller 10 stops all voltage and current to the battery connected to channel X and alternately blinks the red and green LED's associated with channel X at block 216.

The test carried out at blocks 212, 214 and 216 is such that if a battery connected to channel X is finished charging, and the battery is still connected to the output connection for the channel and the battery has also been charging for a time that is greater than a minimum time but is less than the maximum time, the microcontroller 10 should see a discernable voltage drop from the value STBLBAT of 15 volts to approximately 13 or 14 volts. If the voltage drop is not seen, power is cut off to all four of the batteries. This feature ensures that if one of the FETs 40 associated with a particular channel fails, the printer battery connected to that channel will not be overcharged. At block 218, the microcontroller 10 increments the pointer X and determines at block 220 whether all of the channels have been checked. If so, the microcontroller 10 proceeds to block 170 to again sample the battery voltage on each of the channels from the analog to digital converter 46.

The Clear subroutine depicted in FIG. 4 is called by the microcontroller 10 at block 204 of the Main program if it is determined that there is no battery connected to a particular channel and the sensed voltage on that channel is greater than the value nobat. Upon entering the Clear subroutine, the microcontroller 10 at block 222 resets the various variables associated with a given channel to a level appropriate for a new battery charge cycle. The microcontroller 10, thereafter at block 224 determines whether X is equal to 0 and if so, at block 226, the microcontroller 10 turns off the LED's associated with channel 0 by clearing PB0 and PB1. At block 228 the microcontroller 10 then sets the output port PC0 high in order to ensure that channel 0 is on a trickle charge. Similarly, at block 230, the microcontroller 10 determines whether the Clear subroutine has been called for channel 1. If so, the microcontroller at block 232 clears ports PB2 and PB3 to turn the LED's for channel 1 off and at block 234 sets PC1 to provide a trickle charge on channel 1. At block 236 the microcontroller 10 determines whether Clear has been called for channel 2 and if so, at block 238 the microcontroller 10 clears ports PB4 and PB5 to turn the LED's off for channel 2. Thereafter, the microcontroller 10 at block 240 sets ports PC2 to provide a trickle charge on channel 2. If the microcontroller 10 determines that the Clear subroutine has been called for channel 3 at block 242, the microcontroller 10 proceeds to block 244 to clear ports PB6 and PB7 to turn off the LED's associated with the third channel and at block 246 sets the port PC3 to provide a trickle charge on channel 3.

As discussed above, the Display subroutine shown in FIG. 5 is called by the microcontroller 10 at block 198 as shown in FIG. 2 if it is determined that a battery is connected to a given channel X. When the microcontroller 10 enters the display subroutine, the microcontroller determines at block 250 whether the badbat flag for channel X is set or not. If the badbat flag for channel X is set, the microcontroller proceeds to block 252 to blink the red LED on and off for channel X to indicate that the battery connected to channel X is defective. If the microcontroller determines at block 250 that the badbat flag for channel X is equal to 0, the microcontroller proceeds to block 254 to determine whether the battery connected to channel X is finished charging. If the microcontroller 10 determines that the Finish flag is set equal to 0 indicating that the battery connected to channel X is still charging, the microcontroller 10 proceeds to block 258 to turn on the red LED for channel X. A red LED associated with a given channel indicates that the battery connected thereto is still charging. If, however, the microcontroller 10 determines at block 254 that the finish flag is set equal to 1, the microcontroller proceeds to block 256 to turn on the green LED associated with the given channel X. The green LED when lit for a given channel indicates that the battery connected to that channel is fully charged.

Figure 6A:
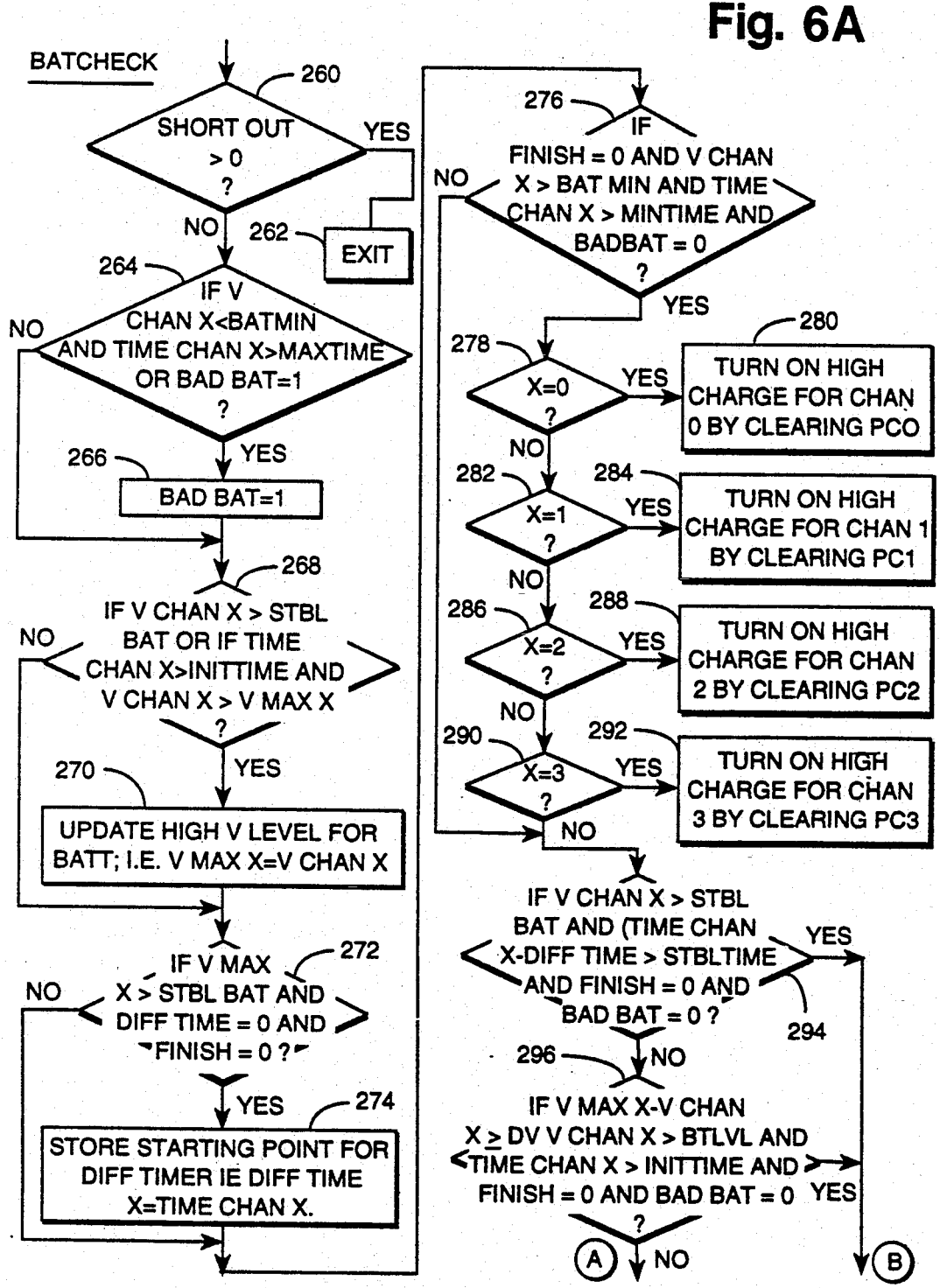
FIGS. 6A and B form a flow chart illustrating the BatCheck software routine of the microcontroller shown in FIG. 1.
Figure 6B:
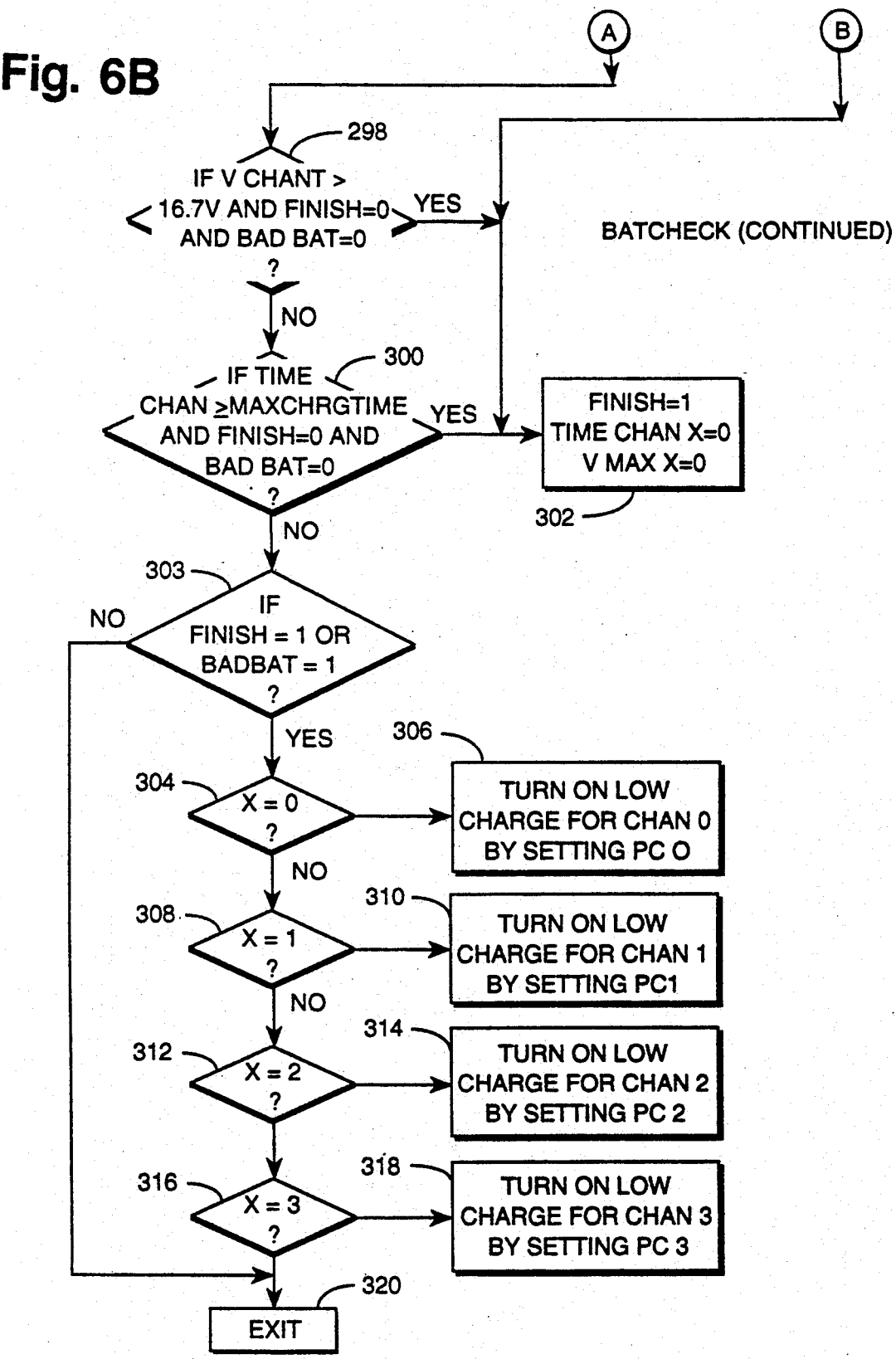

The Batcheck subroutine depicted in FIG. 6 is called at block 200 depicted in FIG. 2. The microcontroller 10 operates in accordance with the Batcheck subroutine to check all of the battery parameters for a given channel and determines if the channel should be on high charge or trickle charge. This subroutine further determines whether a battery is fully charged or not. Upon entering the Batcheck subroutine, the microcontroller 10 determines at block 260 whether the variable shortout for channel X is greater than 0. If so, the microcontroller determines that there has been a short detected on channel X and returns to the Main program at block 262 to determine whether the short on channel X is momentary or permanent. As discussed above, a short on a given channel is identified as permanent if the variable shortout is determined to be greater than the value short-time at block 182. The badbat flag is then set at block 184 and the badbat indication provided by the red LED associated with the given channel. If there is no short on channel X, the microcontroller 260 proceeds to block 264.

At block 264, the microcontroller 10 determines if the battery has reached a minimum voltage on trickle charge within 11 minutes from the time that the battery was detected at block 194. More particularly, at block 264 the microcontroller determines whether the voltage on channel X is less than batmin which represents a minimum battery voltage of 10 volts for a high charge start and whether the timer for channel X has a value greater than maxtime which represents the maximum time of 11 minutes for a battery to attain the minimum battery voltage, i.e., 10 volts. If so, the microcontroller proceeds to block 266 to set the badbat flag equal to 1. From either of blocks 264 or 266, the microcontroller 10 proceeds to block 268 to see if the battery voltage on channel X is greater than stblbat, i.e., greater than 15 volts and stable and, if so, the microcontroller 10 automatically updates a variable, Vmax for channel X. More particularly, at block 268, the microcontroller determines whether the voltage on channel X is greater than stblbat or whether the timer for channel X has a value that is greater than a value, inittime, which represents the battery stabilization time for the initial voltage spike; the voltage on channel X is greater than the variable last stored for Vmax for channel X; and the battery on channel X is not finished charging. If so, the microcontroller 10 proceeds to block 270 to update the high voltage level for battery X by setting Vmax X equal to the voltage sensed for channel X. Thereafter, the microcontroller 10 at block 272 determines whether the value Vmax X is greater than stblbat; a value Difftime is equal to 0; and the battery for channel X is not finished charging. If so, the microcontroller 10 proceeds to block 274 to store the starting point for the difference timer value, Difftime, by setting it equal to the value of the timer for channel X at that point. The microcontroller then proceeds to block 276.

At block 276 the microcontroller 10 determines whether the battery coupled to channel X has finished charging and if not whether the battery has been on trickle charge for at least three minutes and has further attained a value greater than 10 volts. If so, the microcontroller 10 switches the state of the current source associated with channel X from the low charge or trickle charge state to the high charge state. More particularly, at block 276, the microcontroller determines if the finish flag is set equal to 0; the voltage on channel X is greater than the batm in value of 10 volts; the timer for channel X is greater than the value mintime of three minutes and the bat flag is not set. If so, the microcontroller proceeds to blocks 278, 282, 286, and 290 to determine which channel should be switched to high charge from trickle charge. If the microcontroller 10 determines that the channel X has reached 10 volts after three minutes and is not finished charging, the microcontroller proceeds to block 280 to turn on the high charge for channel 0 by clearing port PC0. If the microcontroller 10 determines at block 282 that X equals 1, the microcontroller proceeds to block 284 to turn on the high charge for channel 1 by clearing the port PC1. Similarly, if X is equal to 2 as determined by the microcontroller 10 at block 286, the microcontroller 10 proceeds to block 288 to turn on the high charge for channel 2 by clearing the port PC2. If the microcontroller 10 determines that X is equal to 3 at block 290, the microcontroller proceeds to block 292 to turn on the high charge for channel 3 by clearing port PC3. From blocks 280, 284, 288 or 292, the microcontroller proceeds to block 294.

In order to determine whether a battery is fully charged and to prevent overcharging of a battery, four different events are detected that cause the microcontroller 10 to change the state of the current source coupled to the battery from the high charge state to the low charge state as depicted in blocks 294, 296, 298, and 300. More particularly, at block 294 the microcontroller 10 determines if the battery voltage for channel X has been greater than 15 volts for 30 minutes and, if so, the microcontroller 10 determines that the battery is fully charged. Specifically, at block 294 the microcontroller determines whether the voltage of the battery on channel X is greater than the value stblbat of 15 volts; whether the difference between the timer value for channel X and the value Difftime calculated at block 274 is greater than the value stbltime of 30 minutes; and whether the finish flag and badbat flag are both 0. If so, the microcontroller 10 proceeds to block 302 to set the finish flag and reset the timer for channel X to 0 and further reset the value Vmax for channel X to 0.

If the microcontroller 10 determines that the battery voltage has not been greater than 15 volts for 30 minutes, the microcontroller proceeds to block 296 to determine whether the second event has occurred. More particularly, at block 296 the microcontroller 10 determines whether the battery voltage sensed on channel X has peaked and, if so, the microcontroller proceeds to block 302. Specifically, at block 296 the microcontroller 10 determines whether the difference between Vmax for channel X and the sensed voltage on channel X is greater than or equal to DV representing the minimum negative delta voltage drop of, for example, 104.3 mV. If so, and the voltage on channel X is also greater than a value BTLVL of 15 volts representing the minimum battery voltage required for the negative delta v check; the timer on channel X is greater than inittime representing the battery stabilization time for the initial voltage spike; and the finish flags and badbat flags are both set equal to 0, then the microcontroller proceeds block 302. Again, at block 302 the finish flag is set and both the timer and Vmax values reset to 0.

If the microcontroller 10 determines that the events of blocks 294 or 296 are not detected, the microcontroller proceeds to block 298 to determine if a third event has occurred. More particularly, the microcontroller 10 at block 298 determines whether the battery voltage on channel X is greater than a battery cut-off value of 16.7 V and the finish and badbat flags are set equal to 0. If so, the microcontroller proceeds to block 302 as discussed above. If neither the first, second or third events is as depicted at blocks 294, 296 and 298 are detected, the microcontroller 10 proceeds to block 300 in order to detect a fourth event. More particularly, at block 300, the microcontroller 10 determines whether the timer for channel X has reached 90 minutes and the current source is in a high charge state, then the microcontroller 10 proceeds to block 302. More particularly, at block 300, if the timer for channel X is greater than or equal to a value MAXCHRGTIME of 90 minutes representing the time, as measured from the instance that the battery is first detected and both the finish and badbat flags are set equal to 0 then the microcontroller proceeds from block 300 to block 302 in order to set the finish flag and reset the timer for channel X and the value Vmax for channel X.

The microcontroller 10 next proceeds to block 303 to determine if the finish flag is set or the badbat flag is set. If either one of those events occurs, at blocks 306, 310, 314, and 318 the microcontroller 10 switches the state of the current source for the particular channel X to the low charge or trickle state. More particularly, if X equals 0 as determined by the microcontroller at block 304, the microcontroller 10 at block 306 sets the output port PC0 high to cause the current source 24 for channel 0 to switch to the low charge state. If the microcontroller 10 determines at block 308 that X equals 1, the microcontroller at block 310 sets the output port PC1 to switch the state of the current source 26 to the low charge state. Similarly, if the microcontroller 10 determines that X equals 2 at block 312, the microcontroller at block 314 sets the output port PC2 in order to switch the state of the current source 28 for channel 2 to the low charge state. Further, if the microcontroller 10 determines at block 316 that X is equal to 3, the microcontroller at block 318 sets the output port PC3 for channel 3 to switch the current source 30 to the low charge state. Thereafter, at block 320 the microcontroller 10 exits the Batcheck subroutine and returns to the Main program depicted in FIG. 2.

Because the microcontroller 10 looks for the occurrence of a number of events in order to determine whether a battery is fully charged, the battery charger of the present invention is more reliable in preventing overcharging and damage to the rechargeable batteries used therewith. Further, by examining both the sensed voltage and timer values for a particular channel, the microcontroller 10 can more accurately detect a fully charged battery or a bad battery.

The microcontroller 10 performs diagnostics continuously during the charging of a battery. For example, a microprocessor failure is detected any time that the hold signal is not generated substantially periodically at the output port PC7 since the absence of the hold signal prevents the one shot 66 from re-triggering which in turn prevents the relay 64 from being energized. When the relay 64 is not energized, power is cut off from the current sources 24, 26, 28, and 30 to prevent charging of the batteries connected to the channels 0, 1, 2, and 3. A software failure is detected by the microcontroller 10 if the timer for a given channel reaches 90 minutes and the current source is in the high state. In the event of such an occurrence indicating a possible problem with the software of the battery charger, the microcontroller 10 automatically controls the current source to switch from a high charge state to a trickle charge state. Failure of any of the FET's 40 of the current sources 24, 26, 28, and 30 is detected if the battery is stuck on high charge as determined at block 212 of the Main program. At block 212 the microcontroller switches to a trickle charge if the a voltage drop from the value stblbat of 15 volts to approximately 13 or 14 volts is not detected. Further, the microcontroller 10 identified a bad battery connected to a particular channel by detecting a permanent short on the channel's output or by determining that the battery has not reached a minimum value of 10 volts on trickle charge within 11 minutes from the time that the battery is detected. The battery charger of the present invention is thus capable of quickly charging a battery without overcharging it.

Many modifications and variations of the present invention are possible in light of the above teachings. Thus, it is to be understood that, within the scope of the appended claims, the invention may be practiced otherwise than as described herein above.

What is claimed and desired to be secured by Letters Patent is:

1. A battery charger for a rechargeable battery comprising:
    a current source switchable between a low charge state and a high charge state to provide current to said battery at a first level in said low charge state and to provide current to said battery at a second level in said high charge state;
    means for sensing the voltage of said battery; and
    a controller responsive to said voltage sensing means for controlling said current source to switch from said high charge state to said low charge state, said controller including a plurality of means for detecting events to cause said controller to switch from said high charge state to said low charge state upon the detection of any one of said events, one of said event detecting means including means for detecting a predetermined drop in said battery voltage after said battery voltage has reached a first predetermined level and another of said event detecting means including means for detecting that said battery voltage has been above a second predetermined level for a first period of time.

2. The battery charger as recited in claim 1 wherein one of said event detecting means includes means for detecting that said battery voltage has reached a cutoff level indicating that said battery should be fully charged.

3. The battery charger as recited in claim 1 wherein one of said event detecting means includes means for determining the length of time that said battery is coupled to said charger and means responsive to said time determining means for detecting that said battery has been coupled to said charger for at least a predetermined length of time and said current source is in said high charge state.

4. The battery charger as recited in claim 1 wherein said controller includes means responsive to said voltage sensing means for detecting that a battery is coupled to said charger; and means for controlling said current source to provide said current at said first level in said low charge state for a minimum period of time upon the detection of a battery coupled to said charger.

5. The battery charger as recited in claim 4 wherein said controller includes means for determining whether said battery voltage has reached a minimum battery voltage within a maximum time period measured from the time that said battery is detected as being coupled to said charger; and means for providing a bad battery indication if said battery does not reach said minimum battery voltage within said maximum period of time.

6. The battery charger as recited in claim 1 wherein said controller includes means for determining whether said current source is in said high charge state when it should have switched to said low charge state; and means for providing an indication that said charger has malfunctioned in response to a determination that said battery is in said high charge state when it should be in said low charge state.

7. A battery charger for a plurality of battery powered devices comprising:
    a plurality of current sources, each current source being connectable to a battery of one of said plurality of devices for independently charging each of said devices, each of said current sources being switchable between a low charge state and a high charge state to provide current to said connected battery at a first level in said low charge state and to provide current to said connected battery at a second level in said high charge state to charge said battery;
    means for independently sensing the battery voltage of each of said devices;
    a controller coupled to said sensing means and each of said current sources for independently controlling each of said current sources, said controller including a timer means for independently measuring the charging time of each of said batteries and means responsive to said voltage sensing means and timer means for determining whether a sensed battery voltage is above a predetermined level for a given period of time, said controller controlling each of said current sources to switch from said high charge state to said low charge state in response to a determination that the sensed voltage of the battery connected to said current source is above said predetermined level for said given period of time.

8. A battery charger for a plurality of battery powered devices as recited in claim 7 wherein said controller includes means for detecting peaking of each of the sensed battery voltages and said controller controlling each of said current sources to switch from said high charge state to said low charge state in response to a detected peaking of the sensed voltage of the battery connected to said current source.

9. A battery charger for a plurality of battery powered devices as recited in claim 7 wherein said controller includes means for determining whether a sensed battery voltage has reached a cut-off level indicating that said battery should be fully charged and said controller controlling each of said current sources to switch from said high charge state to said low charge state in response to a determination that the sensed voltage of the battery connected to said current source has reached said cut-off level.

10. A battery charger for a plurality of battery powered devices as recited in claim 7 wherein said controller includes means responsive to said timer means for determining whether a printer battery has been charging for a predetermined length of time and whether said current source is in said high charge state, said controller controlling each of said current sources to switch from said high charge state to said low charge state in response to a determination that the battery connected to said current source has been charging for a predetermined length of time and said current source is in said high charge state.

11. A battery charger for a plurality of battery powered devices as recited in claim 7 wherein said controller includes means for detecting that a battery is coupled to a current source; and
means for controlling said current source to provide said current at said first level in said low charge state for a minimum period of time upon the detection of said battery.

12. A battery charger for a plurality of battery powered devices as recited in claim 11 wherein said controller includes means for determining whether said battery voltage has reached a minimum battery voltage within a maximum time period measured from the detection that said battery is coupled to said charger; and means for providing a bad battery indication if said battery does not reach said minimum battery voltage within said maximum period of time.

13. A battery charger for a plurality of battery powered devices as recited in claim 7 wherein said controller includes means for determining whether said current source is in said high charge state when said current source should have switched to said low charge state; and means for providing an indication that said charger has malfunctioned in response to a determination that said battery is in said high charge state when it should be in said low charge state.

14. A battery charger for at least one rechargeable battery comprising:
a current source connectable to a battery, said current source being switchable between a low charge state and a high charge state to charge said battery;
a controller having a memory and a microprocessor operable in accordance with software stored in said memory for controlling the state of said current source, said controller having a diagnostic system operating continuously during the charging of a battery and including
means for detecting a malfunction in said microprocessor; and
means for preventing said current source from charging a battery in response to a microprocessor malfunction.

15. A battery charger as recited in claim 14 wherein said diagnostic system includes means for detecting a software malfunction, said controller being responsive to a detected software malfunction to cause said current source to operate in said low charge state.

16. A battery charger as recited in claim 15 wherein said software malfunction detecting means includes means for determining whether said battery has been coupled to said current source for at least a given period of time and said current source is in said high charge state.

17. A battery charger as recited in claim 14 wherein said diagnostic system includes means for detecting whether said current source is in a high charge state when said current source should have switched to said low charge state and display means for providing a visual indication of a current source malfunction upon the detection that said current source is in said high charge state when it should be in said low charge state.

18. A battery charger as recited in claim 14 wherein said diagnostic system includes means for detecting a bad battery and display means for providing a visual indication of a bad battery upon the detection thereof.

19. A battery charger as recited in claim 18 wherein said bad battery detecting means includes means for detecting that a battery is coupled to said charger; means for measuring the length of time that said battery is charging; means for sensing the voltage of said battery; and means for determining whether said battery voltage has reached a minimum level within a maximum period of time.

20. A battery charger as recited in claim 18 wherein said bad battery detecting means includes means for detecting whether said current source has a shorted output.

21. A battery charger as recited in claim 14 wherein said diagnostic system includes means for detecting whether a battery is connected to said current source and means for performing power up diagnostics if a battery is not detected.

22. A battery charger as recited in claim 21 wherein said power up diagnostic means includes means for determining whether said current source is providing current when it should not and means for determining whether said current source is not providing current when it should.

23. A battery charger as recited in claim 21 wherein said power up diagnostic means includes means for determining whether the switching of said current source is malfunctioning.

24. A battery charger having a plurality of channels each channel connectable to a battery of a battery powered device for simultaneously and independently charging a plurality of battery powered devices, said charger comprising:
a plurality of current sources each of said current sources being associated with one of said channels and switchable between a high charge state and a low charge state to charge a printer battery connected to the associated channel;

a power supply;

switch means disposed between said power supply and each of said current sources for coupling power to each of said current sources when said switch means is in a first position and said switch means cutting off power to each of said current sources when in a second position, said switch means being responsive to a signal recurring substantially periodically to maintain itself in said first position, said switch means being in said second position in the absence of said signal;

a controller coupled to each of said current sources and to said switch means, said controller controlling the state of each of said current sources and said controller providing said recurring signal to said switch means, said switch means preventing each of said current sources from charging a battery in response to a malfunction in said controller that prevents said controller from applying said recurring signal substantially periodically.

25. A battery charger as recited in claim 24 including means for independently sensing the battery voltage of each of said printers, said controller including a timer means for independently measuring the charging time of each of said printers' batteries and the controller independently controlling each of said current sources to switch from a low charge state to a high charge state and from a high charge state to a low charge state in response to the sensed voltage and charging time of the battery connected to the current source.

26. A battery charger as recited in claim 25 wherein said controller includes means for detecting peaking of each of the sensed battery voltages and said controller controlling each of said current sources to switch from said high charge state to said low charge state in response to a detected peaking of the sensed voltage of the battery connected to said current source.

27. A battery charger as recited in claim 25 wherein said controller includes means responsive to said voltage sensing means and timer means for determining whether a sensed battery voltage is above a predetermined level for a given period of time and said controller controlling each of said current sources to switch from said high charge state to said low charge state in response to a determination that the sensed voltage of the battery connected to said current source is above said predetermined level for said given period of time.

28. A battery charger as recited in claim 25 wherein said controller includes means for determining whether a sensed battery voltage has reached a cut-off level indicating that said battery should be fully charged and said controller controlling each of said current sources to switch from said high charge state to said low charge state in response to a determination that the sensed voltage of the battery connected to said current source has reached said cut-off level.

29. A battery charger as recited in claim 25 wherein said controller includes means responsive to said timer means for determining whether a printer battery has been charging for a predetermined length of time and whether said current source is in said high charge state, said controller controlling each of said current sources to switch from said high charge state to said low charge state in response to a determination that the battery connected to said current source has been charging for a predetermined length of time and said current source is in said high charge state.

30. A battery charger as recited in claim 25 wherein said controller includes means for detecting that a battery is coupled to a current source; and means for controlling said current source to provide said current at said first level in said low charge state for a minimum period of time upon the detection of said battery.

31. A battery charger as recited in claim 30 wherein said controller includes means for determining whether said battery voltage has reached a minimum battery voltage within a maximum time period measured from the detection that said battery is coupled to said charger; and means for providing a bad battery indication if said battery does not reach said minimum battery voltage within said maximum period of time.

32. A battery charger as recited in claim 25 wherein said controller includes means for determining whether said current source is stuck in said high charge state when it should have switched to said low charge state; and means for providing an indication that said charger has malfunctioned in response to a determination that said battery is in said high charge state when it should be in said low charge state.

33. A battery charger for a rechargeable battery comprising:

a current source connectable to said battery, said current source being switchable between a low charge state and a high charge state to provide current to said connected battery at a first level in said low charge state and to provide current to said connected battery at a second level in said high charge state to charge said battery;

means for sensing the voltage of said battery; and a controller coupled to said sensing means and said current source, said controller including a timer means for measuring the charging time of said battery and means responsive to said voltage sensing means and said timer means for determining whether a sensed battery voltage is above a predetermined level for a given period of time, said controller controlling said current source to switch from said high charge state to said low charge state in response to a determination that the sensed voltage of the battery is above said predetermined level for said given period of time.

34. A battery charger for a rechargeable battery comprising:

a constant current source connectable to said battery, said current source having a switch means controllable to change the current level provided by said current source from a first level to a second level;

means for sensing the voltage of said battery; and a controller coupled to said sensing means and to said switch means for controlling said current source to switch from providing current at said first level to providing current at said second level, said controller including means for determining whether said current source has failed to switch from providing current at said first level.

35. A battery charger as recited in claim 34 wherein said switch means is controllable by said controller to continuously vary the level of current provided by said current source between a first limit and a second limit.

36. A battery charger as recited in claim 34 including display means for providing an indication that said current has failed to switch.

* * * * *